United States Patent
Jeon

(10) Patent No.: US 9,055,201 B2
(45) Date of Patent: Jun. 9, 2015

(54) APPARATUS AND METHOD OF STORING AND SEARCHING FOR IMAGE

(71) Applicant: Samsung Techwin Co., Ltd., Changwon (KR)

(72) Inventor: Ki-Yong Jeon, Changwon (KR)

(73) Assignee: SAMSUNG TECHWIN CO., LTD., Changwon-Si (KR)

( * ) Notice: Subject to any disclaimer, the term of this patent is extended or adjusted under 35 U.S.C. 154(b) by 309 days.

(21) Appl. No.: 13/651,498

(22) Filed: Oct. 15, 2012

(65) Prior Publication Data

US 2013/0093896 A1  Apr. 18, 2013

(30) Foreign Application Priority Data

Oct. 14, 2011 (KR) .................. 10-2011-0105535
Aug. 16, 2012 (KR) .................. 10-2012-0089666

(51) Int. Cl.
- *H04N 7/18* (2006.01)
- *G08B 13/196* (2006.01)
- *H04N 21/2187* (2011.01)
- *H04N 21/472* (2011.01)

(52) U.S. Cl.
CPC ............ *H04N 7/185* (2013.01); *H04N 21/2187* (2013.01); *H04N 21/47202* (2013.01); *G08B 13/19669* (2013.01); *G08B 13/19697* (2013.01)

(58) Field of Classification Search
CPC ... H04N 7/185; H04N 7/188; H04N 21/2187; H04N 21/47202; G06K 9/00771; G08B 13/19602; G08B 13/19695; G08B 13/19697
See application file for complete search history.

(56) References Cited

U.S. PATENT DOCUMENTS

| | | | |
|---|---|---|---|
| 2010/0060510 A1* | 3/2010 | Nouvel et al. | 342/29 |
| 2010/0090829 A1* | 4/2010 | Pujol | 340/541 |
| 2010/0231714 A1* | 9/2010 | Flores et al. | 348/143 |
| 2011/0019003 A1* | 1/2011 | Asa et al. | 348/159 |
| 2012/0147184 A1* | 6/2012 | Siann et al. | 348/143 |

FOREIGN PATENT DOCUMENTS

| | | |
|---|---|---|
| JP | 2005-295469 A | 10/2005 |
| KR | 10-0594513 B1 | 6/2006 |
| KR | 10-2006-0083102 A | 7/2006 |
| KR | 10-0998339 B1 | 11/2010 |
| WO | 2007/015631 A1 | 2/2007 |

* cited by examiner

*Primary Examiner* — William C Vaughn, Jr.
*Assistant Examiner* — Eileen Adams
(74) *Attorney, Agent, or Firm* — Sughrue Mion, PLLC

(57) ABSTRACT

An apparatus and method of storing and searching for an image are provided. The apparatus includes: a first signal processor which receives location information about an object detected by a sensor, generates and transmits a camera control signal to a camera based on the location information so that the camera performs a surveillance in a direction according to the camera control signal, and receives from the sensor an alarm signal notifying an intrusion of the object into a preset area; a second signal processor which receives a surveillance image of the intruding object received from the surveillance of the camera; and a control unit which stores the surveillance image in a storage unit.

13 Claims, 10 Drawing Sheets

| TIME | IMAGE | | | | TIME | LOCATION |
|---|---|---|---|---|---|---|
| | IMAGE 1 | ... | IMAGE n | | | |
| ⋮ | ⋮ | ⋮ | ⋮ | | ⋮ | ⋮ |

(a)  (b)

| TIME | IMAGE | LOCATION |
|---|---|---|
| ⋮ | ⋮ | ⋮ |

APPARATUS AND METHOD OF STORING AND SEARCHING FOR IMAGE

CROSS-REFERENCE TO RELATED PATENT APPLICATION

This application claims priority from Korean Patent Application Nos. 10-2012-0089666, filed on Aug. 16, 2012, and 10-2011-0105535, filed on Oct. 14, 2011 in the Korean Intellectual Property Office, the disclosures of which are incorporated herein in their entirety by reference.

BACKGROUND

1. Field

Apparatuses and method consistent with exemplary embodiments relate to an apparatus for storing and searching for an image, and a surveillance system including the apparatus.

2. Description of the Related Art

Network video recorder (NVR) or digital video recorder (DVR) systems paired with (i.e. interlocked or communicating with) a general camera or a closed circuit television (CCTV) camera records image data without an outside trigger or starts recording when a movement is detected from an image upon analyzing image data. Alternatively, the NVR or DVR system may record image data when an outside input is received through a sensor (for example, a passive infrared sensor (PIR), a dual sensor, etc.).

When image data is continuously recorded without an outside trigger, a data storage space equal to or more than a terabyte may be required.

When recording is performed upon detecting a movement by analyzing image data, it is difficult to detect a movement, and specifically, in a camera or CCTV camera monitoring an outdoor area, accuracy of detecting a movement may deteriorate due to a natural phenomenon (for example, shaking of a tree due to wind).

Also, when a PIR sensor or a dual sensor is used, malfunction frequently occurs according to a surrounding environment of the PIR sensor or the dual sensor, and thus an expected effect as a trigger with respect to a stored image is reduced.

As such, when there is no trigger input, a massive amount of image data may be stored by using poor trigger information. Thus, searching for meaningful information in the NVR or DVR system is time consuming.

SUMMARY

One or more exemplary embodiments provide an apparatus and method capable of effectively storing and searching for an image.

According to an aspect of exemplary embodiments, there is provided an apparatus for storing and searching for an image, the apparatus including: a first signal processor which receives location information about an object detected by a radar sensor, generates and transmits a camera control signal to a camera based on the location information so that the camera performs a surveillance in a direction according to the camera control signal, and receives from the sensor an alarm signal notifying an intrusion of the object into a preset area; a second signal processor which receives a surveillance image of the intruding object received from the surveillance of the camera; and a control unit which stores the surveillance image in a storage unit.

The apparatus storage unit may store location and time information of the object at the time of the intrusion along with the surveillance image of the object.

The camera control signal may control the camera in the direction using at least one of a pan value, tilt value and a zoom value.

The control unit, upon receiving the location information of the object, may switch the apparatus from a standby mode to a surveillance mode in response to the location information of the object so that the first signal processor generates the camera control signal.

The control unit, upon receiving an image request according to a search condition related to a user-designated location information, may search the storage unit and output the stored surveillance image in response to the image request.

The intrusion of the object into the preset area may be determined by the sensor, and the preset area may be a portion of a surveillance range which is initially covered by the sensor and the camera before the camera control signal is generated.

The apparatus may further include at least one of the sensor, the camera, the storage unit and a display unit, wherein the display unit allows a user to input an image request comprising a search condition related to a user-designated location information, and the control unit searches the storage unit and outputs the stored surveillance image in response to the image request, and wherein the sensor determines that the intrusion of the object when a distance between the sensor and the object is within a predetermined intrusion distance, and generates the alarm signal.

According to an aspect of exemplary embodiments, there is provided an apparatus for storing and searching for an image, the apparatus comprising: a signal processor which receives location information about an object detected by a radar sensor and a surveillance image of the object, from a camera that performs a surveillance in a direction according to the location information received from the radar sensor, and the signal processor receives from the radar sensor an alarm signal notifying an intrusion of the object into a preset area; and a control unit which stores the surveillance image in a storage unit after receiving the alarm signal.

The storage unit stores location and time information of the object corresponding to the intrusion along with the surveillance image of the object.

The control unit, upon receiving the location information and the surveillance image of the object, switches the apparatus from a standby mode to a surveillance mode.

The control unit, upon receiving an image request according to a search condition related to a user-designated location information, searches the storage unit and outputs the stored surveillance image in response to the image request.

According to an aspect of another exemplary embodiment, there is provided a method of storing and searching for an image, the method including: receiving location information about an object detected by a radar sensor; generating and transmitting a camera control signal to a camera based on the location information so that the camera performs a surveillance in a direction according to the camera control signal; receiving from the sensor an alarm signal notifying an intrusion of the object into a preset area; receiving a surveillance image of the intruding object received from the surveillance of the camera; and storing the surveillance image in a storage unit.

The surveillance image may be stored along with location and time information of the object corresponding to the intrusion.

The camera control signal may control the camera in the direction using at least one of a pan value, tilt value and a zoom value.

The method may further include receiving an image request according to a search condition related to a user-designated location information; and searching the storage unit and outputting the stored surveillance image in response to the image request.

The intrusion of the object into the preset area may be determined by the sensor, and the preset area may be a portion of a surveillance range which is initially covered by the sensor and the camera before the camera control signal is generated.

According to an aspect of another exemplary embodiment, there is provided a method of storing and searching for an image, the method including: receiving location information about an object detected by a radar sensor and a surveillance image of the object, from a camera that performs a surveillance in a direction according to the location information received from the radar sensor; receiving from the sensor an alarm signal notifying an intrusion of the object into a preset area; and storing the surveillance image in a storage unit after receiving the alarm signal.

The storage unit stores location and time information of the object corresponding to the intrusion along with the surveillance image of the object.

The control unit, upon receiving the location information and the surveillance image of the object, switches the apparatus from a standby mode to a surveillance mode.

The control unit, upon receiving an image request according to a search condition related to a user-designated location information, searches the storage unit and outputs the stored surveillance image in response to the image request.

BRIEF DESCRIPTION OF THE DRAWINGS

The above and other aspects will become more apparent by describing in detail exemplary embodiments with reference to the attached drawings in which.

DETAILED DESCRIPTION

Figure 1:
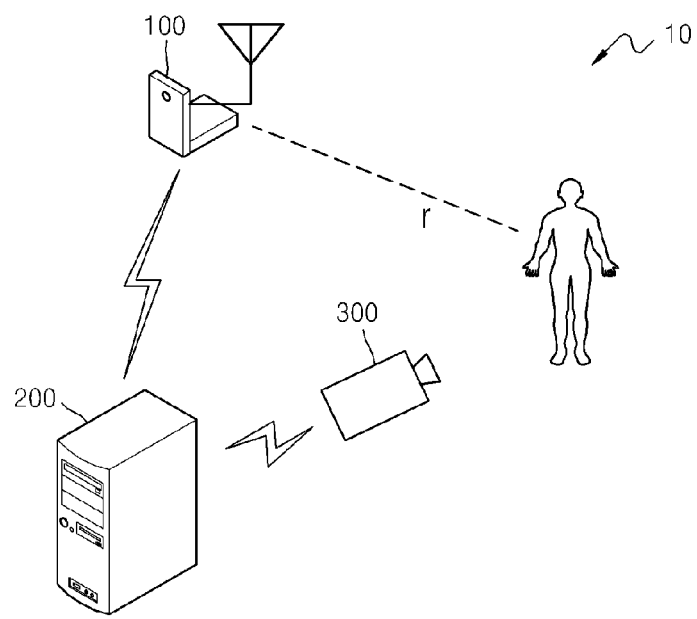
FIG. 1 is a diagram of a radar paired surveillance system according to an exemplary embodiment.

Hereinafter, exemplary embodiments will be described more fully with reference to the accompanying drawings, in which exemplary embodiments are shown. In the drawings, like reference numerals denote like elements. Also, while describing exemplary embodiments, detailed descriptions about related well-known functions or configurations that may diminish the clarity of the points of the exemplary embodiments are omitted.

It will be understood that, although the terms first, second, etc., may be used herein to describe various elements, but these elements should not be limited by these terms. These terms are only used to distinguish one element from another element. For example, a first element could be termed a second element and similarly, a second element could be termed a first element without departing from the teachings of exemplary embodiments. Also, a series of processes of exemplary embodiments not only includes processes performed in time-series, but also includes processes performed in parallel or individually.

As used herein, the term "and/or" includes any and all combinations of one or more of the associated listed items.

FIG. 1 is a diagram of a radar paired surveillance system 10 according to an exemplary embodiment.

Referring to FIG. 1, the radar paired surveillance system 10 includes a radar sensor 100, a camera 300, and an apparatus 200 for storing and searching for an image.

The radar sensor 100 detects and tracks an object that enters a surveillance range and detects a location of the object, by using a radio frequency (RF) signal. The radar sensor 100 detects the object in the surveillance range and determines an intrusion of the object based on location information of the detected object. The location information of the object includes a distance r between the radar sensor 100 and the object (hereinafter, referred to as an object distance r).

The radar sensor 100 transmits the location information of the detected object to the apparatus 200, and upon receiving the location information, the apparatus 200 controls the camera 300 to interlock with the radar sensor 100, to photograph and monitor the detected object. When the object is determined to intrude in the surveillance range, the radar sensor 100 transmits an alarm signal to the apparatus 200, and upon receiving the alarm signal, the apparatus 200 stores a surveillance image captured by the camera 300.

Figure 2:
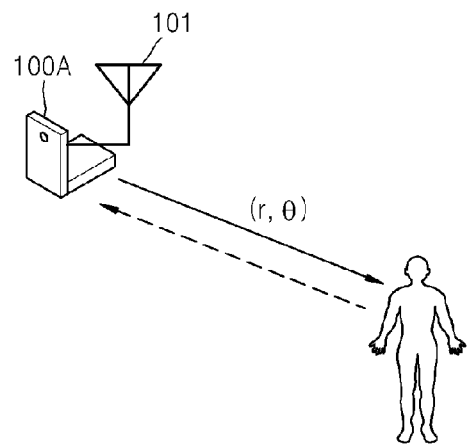
FIG. 2 is a diagram for describing a transceiver integrated radar sensor according to an exemplary embodiment.

The radar sensor 100 may be a transceiver integrated radar sensor or a transceiver separated radar sensor. FIG. 2 is a diagram for describing a transceiver integrated radar sensor 100A according to an exemplary embodiment, and FIG. 3 is a diagram for describing a transceiver separated radar sensor 100B according to an exemplary embodiment.

Referring to FIG. 2, the transceiver integrated radar sensor 100A outputs a radar signal and receives a signal reflected from an object through an antenna 101. The output radar signal proceeds to the object in a straight line, and then returns back after being reflected at the object. The transceiver integrated radar sensor 100A may detect location information including an object distance r and a phase $\theta$ of the object based on the output radar signal and a returned signal. The transceiver integrated radar sensor 100A may determine an intrusion of the object based on the object distance r and the phase θ. The transceiver integrated radar sensor 100A may calculate the object distance r and the phase θ, transmit the location information including the object distance r and the phase θ to the apparatus 200, and transmit an alarm signal to the apparatus 200 when it is determined that the object intruded.

The antennas 101, 104, or 106 may be a single antenna for transmission and reception or an antenna set (for example, two antennas: one which transmits a radar signal and one which receives a returned signal).

Figure 3:
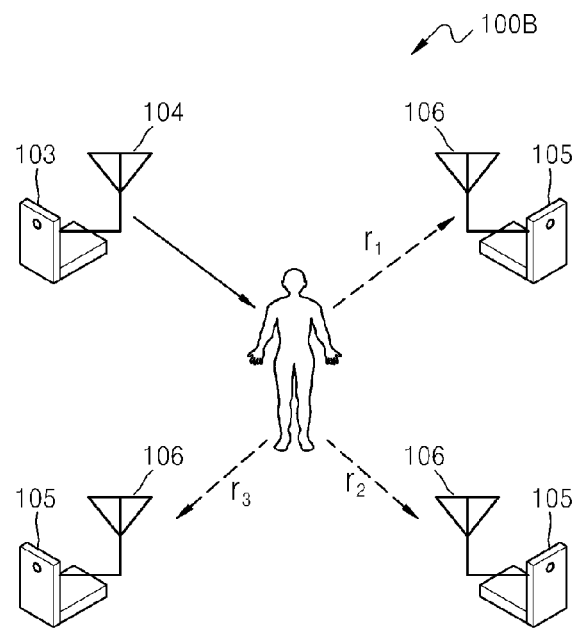
FIG. 3 is a diagram for describing a transceiver separated radar sensor according to an exemplary embodiment.

Referring to FIG. 3, the transceiver separated radar sensor 100B includes a radar transmitter 103 and radar receivers 105.

The transceiver separated radar sensor 100B of FIG. 3 is able to expand an object search distance compared to the transceiver integrated radar sensor 100A of FIG. 2. In this case, the transceiver separated radar sensor 100B includes a plurality of radar receivers 105 with respect to one radar transmitter 103. The radar transmitter 103 and the plurality of radar receivers 105 are spaced apart from one another within a surveillance range, and the transceiver separated radar sensor 100B may calculate location information of an object through the plurality of radar receivers 105 calculating distance information $r_1$, $r_2$, and $r_3$ of the object.

Referring back to FIG. 1, the camera 300 may be a closed circuit television (CCTV) camera installed in the surveillance range and having a pan tilt zoom (PTZ) function. The camera 300 is usually waked up in a surveillance mode and may detect an object while monitoring the surveillance range in a preset method. The camera 300 does not transmit a surveillance image to the apparatus 200 unless a camera control signal is received. Upon receiving the camera control signal from the apparatus 200, the camera 300 stops a surveillance method in the surveillance mode and detects an object at a location aimed by adjusting a direction of the camera 300 according to a PTZ value included in the camera control signal. Then, the camera 300 transmits a captured surveillance image to the apparatus 200 with time information.

The apparatus 200 is connected to the radar sensor and the camera 300 wirelessly or wiredly. The apparatus 200 receives the location information of the detected object from the radar sensor 100, and controls a direction of the camera 300 paired with the radar sensor 100 based on the location information.

When apparatus 200 is in a standby mode, apparatus 200 does not store images. Upon receiving the location information of the object from the radar sensor 100, the apparatus 200 is waked up by using the location information as a first trigger signal and is switched from the standby mode to a surveillance mode. After switching to the surveillance mode, the apparatus 200 controls the camera 300 that is in the surveillance mode to aim at the location of the detected object and monitor the object.

The apparatus 200 receives the location information of the object from the radar sensor 100. Here, the location information includes the object distance r and the phase θ of the object. The apparatus 200 calculates a PTZ value of the camera 300 based on the location information, and outputs a camera control signal having the calculated PTZ value to the camera 300.

Upon receiving the alarm signal notifying an intrusion of the object from the radar sensor 100, the apparatus 200 stores the surveillance image received from the camera 300 by using the alarm signal as a second trigger signal for storing an image. Here, the apparatus 200 may match and store the time information, the location information, and the surveillance image. Accordingly, when a user searches for an image later, the image may be easily searched for by using the location information as a search condition.

Figure 4:
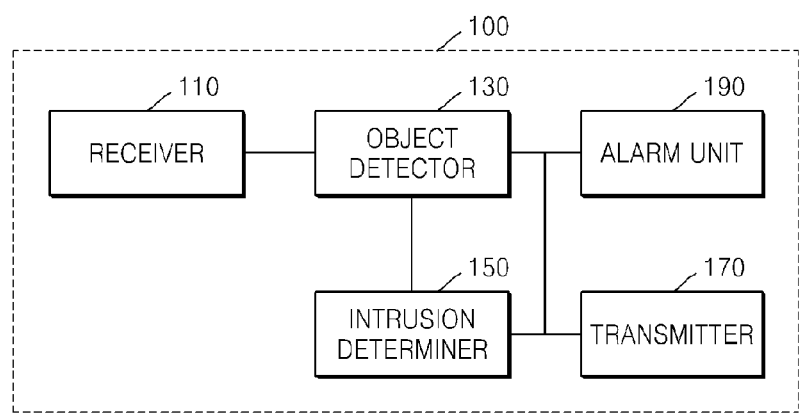
FIG. 4 is a block diagram schematically illustrating a structure of a radar sensor, according to an exemplary embodiment.
Figure 5:
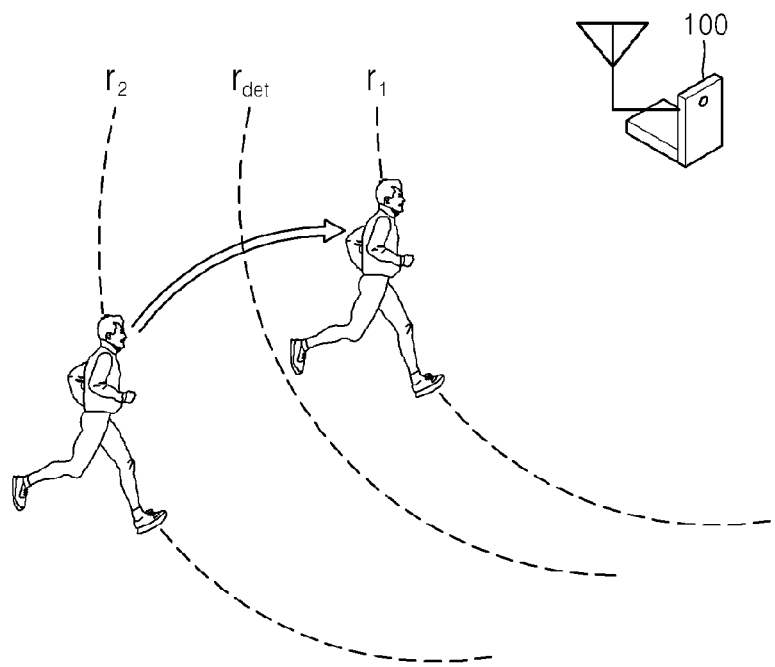
FIG. 5 is a diagram for describing an operation of a radar sensor, according to an exemplary embodiment.

FIG. 4 is a block diagram schematically illustrating a structure of the radar sensor 100, according to an exemplary embodiment. FIG. 5 is a diagram for describing an operation of the radar sensor 100, according to an exemplary embodiment.

Referring to FIG. 4, the radar sensor 100 includes a receiver 110, an object detector 130, an intrusion determiner 150, an alarm unit 190, and a transmitter 170.

The radar sensor 100 determines an existence and a location of an object. The radar sensor 100 of FIG. 4 may be realized as the transceiver integrated radar sensor 100A of FIG. 2 or the transceiver separated radar sensor 100B of FIG. 3.

The receiver 110 receives a radar signal reflected from the object through an antenna.

The object detector 130 removes clutter and noise from the reflected radar signal. For example, the object detector 130 may remove clutter and noise by using a loop-filter algorithm, or a singular value decomposition (SVD) algorithm. Alternatively, the object detector 130 may use any one of various methods without being limited to the above-described algorithms.

The object detector 130 may estimate the object distance r based on similarity between an output radar signal and the reflected radar signal. The object detector 130 may calculate a time difference between the output radar signal and the reflected radar signal by using a cross correlation function, and calculate the object distance r and the phase θ based on the time difference.

The intrusion determiner 150 compares the object distance r and an intrusion distance $r_{det}$. When the object distance r is less than or equal to the intrusion distance $r_{det}$, i.e., when the object is within the intrusion distance $r_{det}$, the intrusion determiner 150 determines that the object intruded. When it is determined that the object intruded, the intrusion determiner 150 generates an alarm signal notifying an event generation and transmits the alarm signal to the alarm unit 190 and the transmitter 170.

Referring to FIG. 5 as well, the intrusion determiner 150 compares the object distance r and the intrusion distance $r_{det}$. When the object moves such that the object distance r is decreased from $r_2$ to $r_1$ that is within the intrusion distance $r_{det}$, the intrusion determiner 150 determines that the object intruded.

Upon receiving the alarm signal notifying the intrusion, the alarm unit 190 generates a warning. The alarm unit 190 may generate a warning sound and/or light without being limited thereto. In this case, the alarm unit 190 may include a siren which generates a warning sound and a light source which generates light.

The transmitter 170 may transmit the location information of the object to the apparatus 200. Here, the location information may include the object distance r or the object distance r and the phase θ. Also, the transmitter 170 transmits the alarm signal to the apparatus 200. In addition, the transmitter 170 may transmit a type of the object to the apparatus 200 with or separately from the location information.

Figure 6:
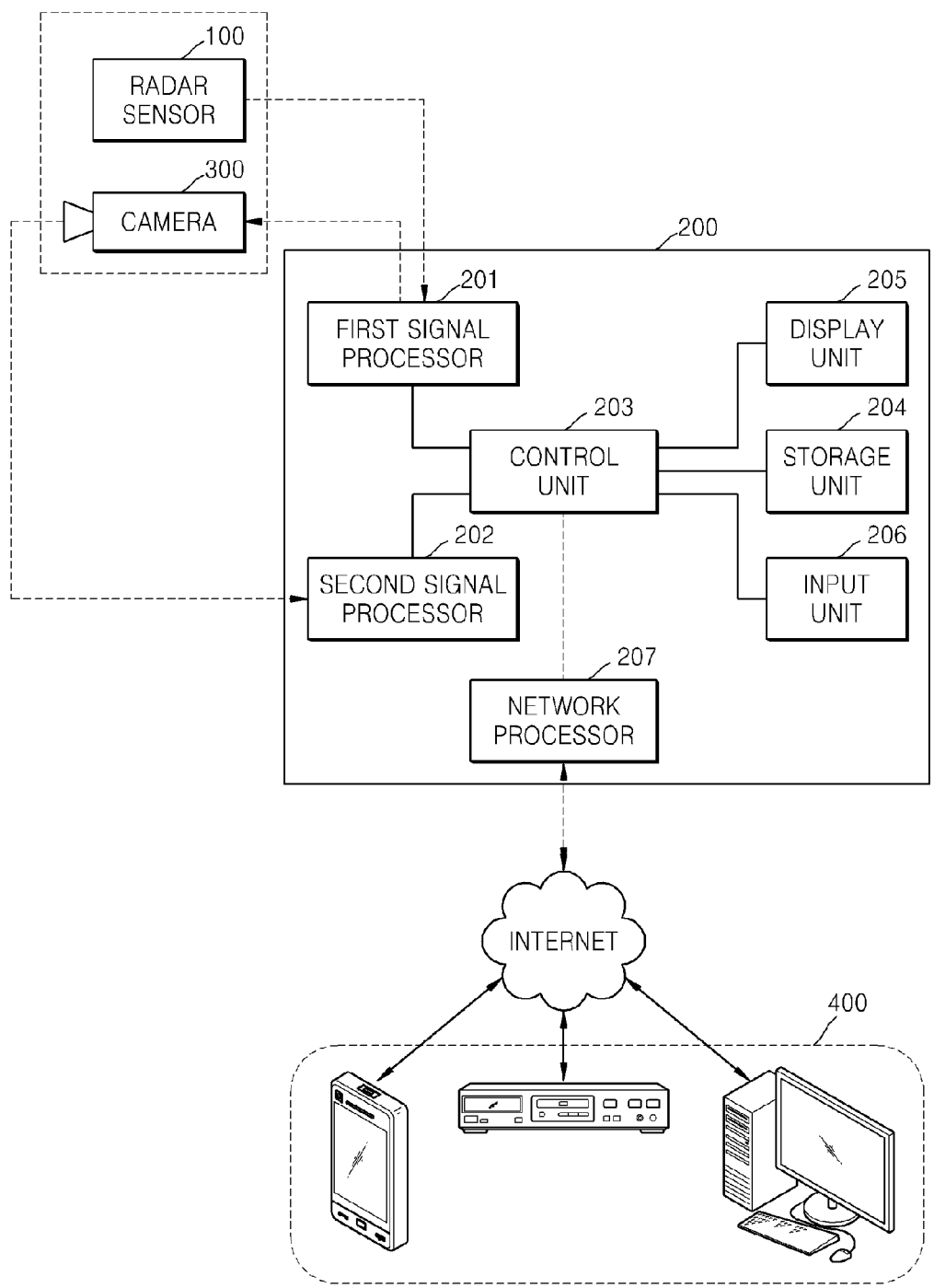
FIG. 6 is a block diagram schematically illustrating an apparatus for storing and searching for an image, according to an exemplary embodiment.
Figures 7, 8, 9:
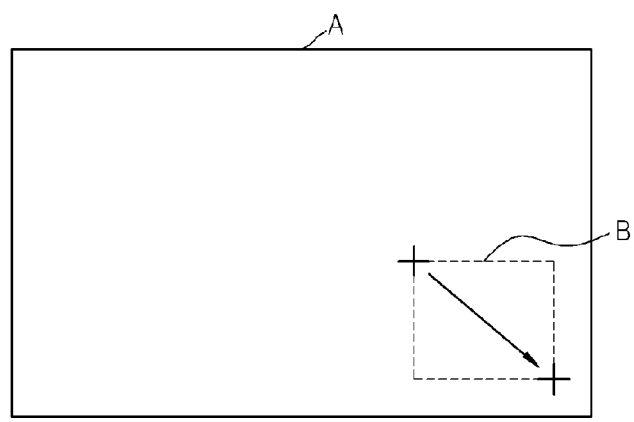
FIGS. 7 and 8 illustrate examples of information stored in a storage unit of the apparatus of FIG. 6.
FIG. 9 is a diagram for describing a method of searching for an image, according to an exemplary embodiment.

FIG. 6 is a block diagram schematically illustrating the apparatus 200 according to an exemplary embodiment. FIGS. 7 and 8 illustrate examples of information stored in a storage unit 204 of the apparatus 200 of FIG. 6.

Referring to FIG. 6, the apparatus 200 communicates with the radar sensor 100 and the camera 300 wirelessly or wiredly.

The apparatus 200 is connected to at least one radar sensor 100 and at least one camera 300 wirelessly or wiredly. The at least one radar sensor 100 and the at least one camera 300 may be distributed in the surveillance range. The radar sensor 100 and the camera 300 may be integrated to monitor a same range. Alternatively, the radar sensor 100 and the camera 300 may be individually distributed and monitor determined ranges. For example, one radar sensor 100 may be paired with the plurality of cameras 300 to monitor a predetermined range.

Examples of the apparatus 200 include not only a digital video recorder (DVR) and a network video recorder (NVR), which are widely used as a CCTV system, but also a personal computer (PC), and a server and a mobile device, which are used for a data storage under a cloud environment.

The apparatus 200 may include a first signal processor 201, a second signal processor 202, a control unit 203, a storage unit 204, a display unit 205, an input unit 206, and a network processor 207.

The first signal processor 201 receives the time information and the location information of the object from the radar sensor 100. The time information may be a time stamp and a detection time of the object. The first signal processor 201 may additionally receive type information of the object from the radar sensor 100.

Under a control of the control unit 203, the first signal processor 201 calculates the PTZ value of the camera 300 based on the location information of the object, generates the camera control signal including the PTZ value, and outputs the camera control signal to the camera 300. The camera control signal may set a photographing direction and a focus of the camera 300 by including a panning and tilting value for rotating the camera 300 in horizontal and vertical directions and a zooming value indicating an image zooming ratio. The camera 300 adjusts the PTZ value according to the camera control signal and photographs the object.

In the current embodiment, the first signal processor 201 generates and provides the camera control signal to the camera 300, but alternatively, the first signal processor 201 may transmit the location information of the object to the camera 300 and the camera 300 may generate the camera control signal based on the location information and set the photographing direction and the focus of the camera 300.

The first signal processor 201 receives the alarm signal from the radar sensor 100 and transmits the alarm signal to the control unit 203.

The second signal processor 202 receives the surveillance image obtained by photographing the object from the camera 300 with the time information, and processes the surveillance image according to a predetermined algorithm. The time information may be a time stamp and a photographing time of the object.

The control unit 203 controls each element of the apparatus 200. If the first signal processor 201 received the location information as the first trigger signal from the radar sensor 100, the control unit 203 wakes up the apparatus 200 and switches the apparatus 200 from the standby mode to the surveillance mode.

The storage unit 204 may include a first storage unit (not shown) for building a database and storing surveillance images received from the camera 300 by matching the surveillance images with time information as shown in a table (a) of FIG. 7, and a second storage unit (not shown) for building a database and storing the location information of the object received from the radar sensor 100 by matching the location information with the time information as shown in a table (b) of FIG. 7. Here, the second storage unit may store the location information with the type information of the object. The first and second storage units may be realized as one or individual storage units. Alternatively, the storage unit 204 may build a database and store the time information, the surveillance image, and the location information by matching the time information, the surveillance image, and the location information as shown in FIG. 8. The storage unit 204 may be a magnetic disc, a memory card, or an optical disc that is embedded in or installable to the apparatus 200.

Upon receiving the alarm signal as the second trigger signal from the first signal processor 201 in the surveillance mode, the control unit 203 may store the surveillance image transmitted from the camera 300 to the second signal processor 202 in the storage unit 204. Alternatively, the control unit 203 may store all surveillance images transmitted from the camera 300 to the second signal processor 202 in the storage unit 204. Here, the control unit 203 may store the surveillance images in predetermined cycles.

The display unit 205 displays an image output from the second signal processor 202 or menu items generated according to a control signal input through the input unit 206. When the user requests for an image through the input unit 206, the display unit 205 may display a search menu item for the user to directly or indirectly select a type and a location of an object or a time (i.e. a search query). The display unit 205 may provide visual and/or auditory information to the user, and may be a liquid crystal display (LCD), an organic light emitting display (OLED), or an electrophoretic display (EPD). The display unit 205 may have a touch screen to receive an input from the user via a touch so as to operate as a user interface.

The input unit 206 may be realized in hardware or software. When the input unit 206 is realized in hardware, for example, a signal may be input through a wired/wireless remote controller or a menu button integrally included in the display unit 205. When the input unit 206 is realized in software, the input unit 206 may be displayed on a display screen of the display unit 205, and for example, a signal may be input through a pointing device, such as a mouse, a keyboard, or a track ball, or sensitivity of a touch screen, such as a finger, a pen, or a stylus system.

The network processor 207 may receive an image request from a user terminal 400 at a remote place through a network, and transmit a searched image to the user terminal 400 wirelessly or wiredly. The user terminal 400 may include a mobile terminal, such as a mobile phone or a personal digital assistant (PDA), a PC, a DVR, or an NVR.

Upon receiving the image request from the user through the input unit 206 or from the user terminal 400 at the remote place through the network processor 207, the control unit 203 may search for and select a corresponding image from the storage unit 204 based on an input search condition, and output the corresponding image to the display unit 205 or transmit the corresponding image to the user terminal 400 through the network processor 207. Here, the control unit 203 may search for an image stored in the storage unit 204 based on the location information of the object.

FIG. 9 is a diagram for describing a method of searching for an image, according to an exemplary embodiment. When a user wants to check whether an event is generated in a predetermined range, the user may set a search range B in an entire surveillance range A as shown in FIG. 9. The user may select the search range B by using the input unit 206 of the apparatus 200 or an input unit of the user terminal 400. Here, the search range B may be selected by setting a block from a mouse pointer on a screen as shown in FIG. 9 or by setting a block using a finger of the user or a stylus on a touch screen.

Alternatively, the search range B may be selected as the user directly inputs coordinates of a desired range via a key input or as the user selects one of ranges divided and provided on a search menu screen.

The control unit 203 searches for location information included in the search range B from the storage unit 204 by using coordinate information of the search range B as a search condition. Then, the control unit 203 may output an image matching the location information to the display unit 205 or to the user terminal 400 through the network processor 207. Accordingly, the user may reproduce the image related to the search range B to check whether an event is generated.

Figure 10:
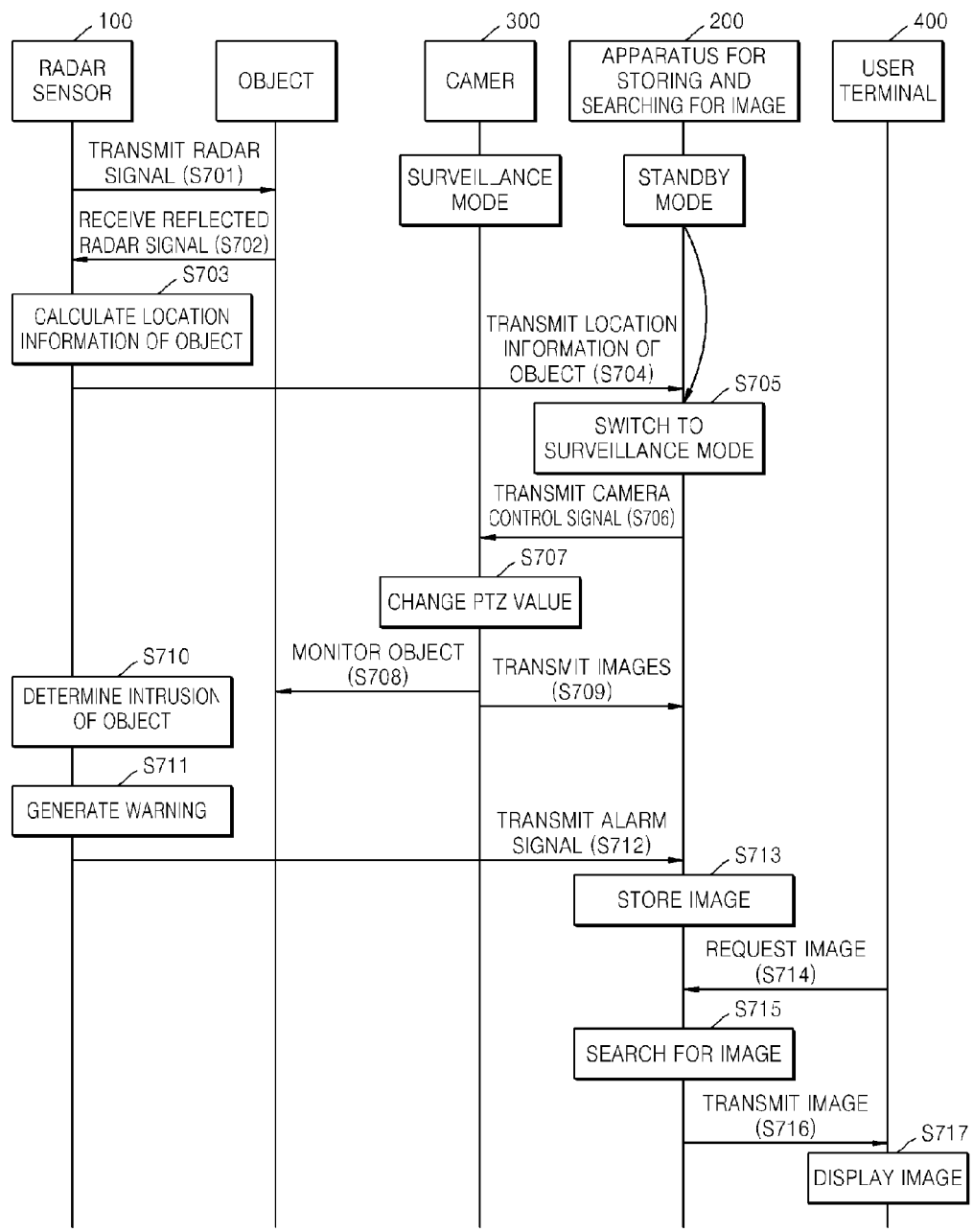
FIG. 10 is a flowchart for schematically describing a surveillance method performed by a radar paired surveillance system, according to an exemplary embodiment.

FIG. 10 is a flowchart for schematically describing a surveillance method performed by a radar paired surveillance system, according to an exemplary embodiment. Hereinafter, details overlapping with those described with reference to FIGS. 1 through 9 are not repeated.

Referring to FIG. 10, the radar sensor 100 transmits a radar signal to a surveillance range in operation S701 and receives the radar signal reflected from an object in operation S702. Here, the camera 300 is in a surveillance mode and detects the object in a predetermined surveillance method, such as a preset method. The apparatus 200 is in a standby mode.

The radar sensor 100 calculates location information of the object based on the reflected radar signal in operation S703. The location information may include an object distance or both an object distance and a phase.

The radar sensor 100 transmits the location information to the apparatus 200 in operation S704.

Upon receiving the location information from the radar sensor 100, the apparatus 200 is switched from a standby mode to a surveillance mode in operation S705. Then, the apparatus 200 sets a PTZ value of the camera 300 based on the location information and transmits a camera control signal including the PTZ value to the camera 300 in operation S706. The apparatus 200 matches and stores the location information and time information.

Upon receiving the camera control signal, the camera 300 changes a PTZ value according to the camera control signal in operation S707. Then, the camera 300 monitors the object by adjusting a photographing direction and a focus according to the changed PTZ value in operation S708. The camera 300 transmits surveillance images captured in the surveillance mode to the apparatus 200 in operation S709.

The radar sensor 100 determines an intrusion of the object while continuously estimating an object distance, and determines that the object intruded when the object distance is within a predetermined intrusion distance in operation S710. When it is determined that the object intruded, the radar sensor 100 generates an alarm signal and a warning in operation S711. The radar sensor 100 transmits the alarm signal to the apparatus 200 in operation S712.

When the apparatus 200 receives the alarm signal from the radar sensor 100 while operating in the surveillance mode, the apparatus 200 stores a surveillance image received from the camera 300 after receiving the alarm signal by matching the surveillance image with time information in operation S713.

Upon receiving an image request with a search condition from the user terminal 400 at a remote place in operation S714, the apparatus 200 searches for a surveillance image according to the search condition in operation S715 and transmits the searched surveillance image to the user terminal 400 in operation S716.

The user terminal 400 displays the received surveillance image in operation S717.

Figure 11:
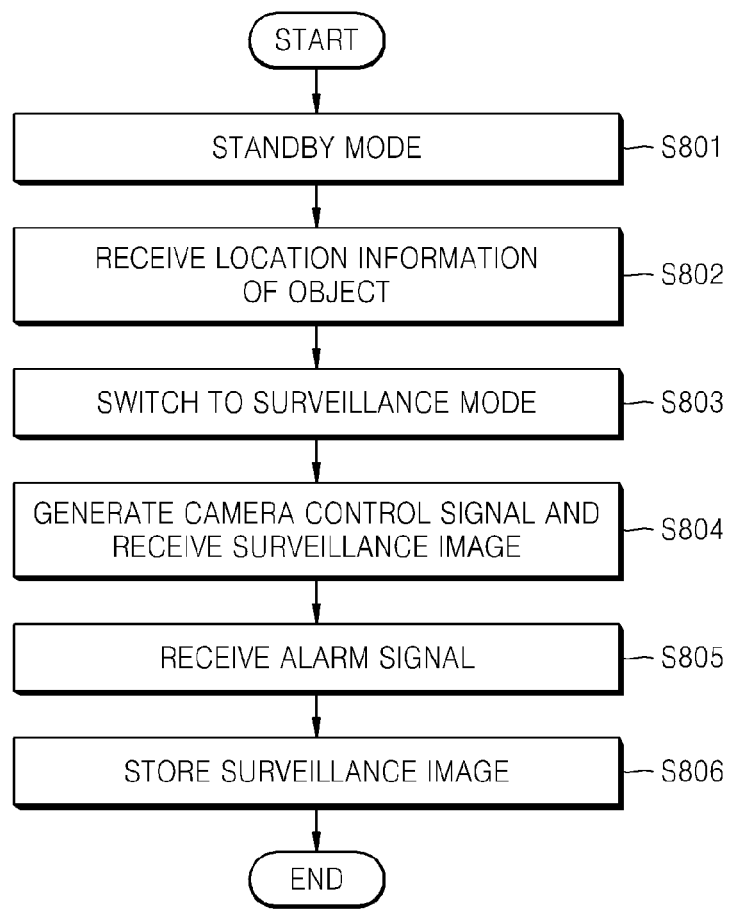
FIG. 11 is a flowchart for schematically describing a method of storing an image performed by an apparatus for storing and searching for an image, according to an exemplary embodiment.

FIG. 11 is a flowchart for schematically describing a method of storing an image performed by the apparatus 200, according to an exemplary embodiment.

Referring to FIG. 11, the apparatus 200 stands by to receive a signal in a standby mode, in operation S801.

Upon receiving location information of an object from the radar sensor 100 in operation S802, the apparatus 200 is switched from the standby mode to a surveillance mode in operation S803. The apparatus 200 matches and stores the location information of the object and time information.

The apparatus 200 generates a camera control signal for controlling a PTZ value of the camera 300 based on the location information and transmits the camera control signal to the camera 300, and receives a surveillance image from the camera 300 in operation S804. The camera 300 monitors the object while changing the PTZ value according to the camera control signal, and transmits the surveillance image to the apparatus 200.

Upon receiving an alarm signal from the radar sensor 100 in operation S805, the apparatus 200 stores the surveillance image received from the camera 300 in operation S806.

Figure 12:
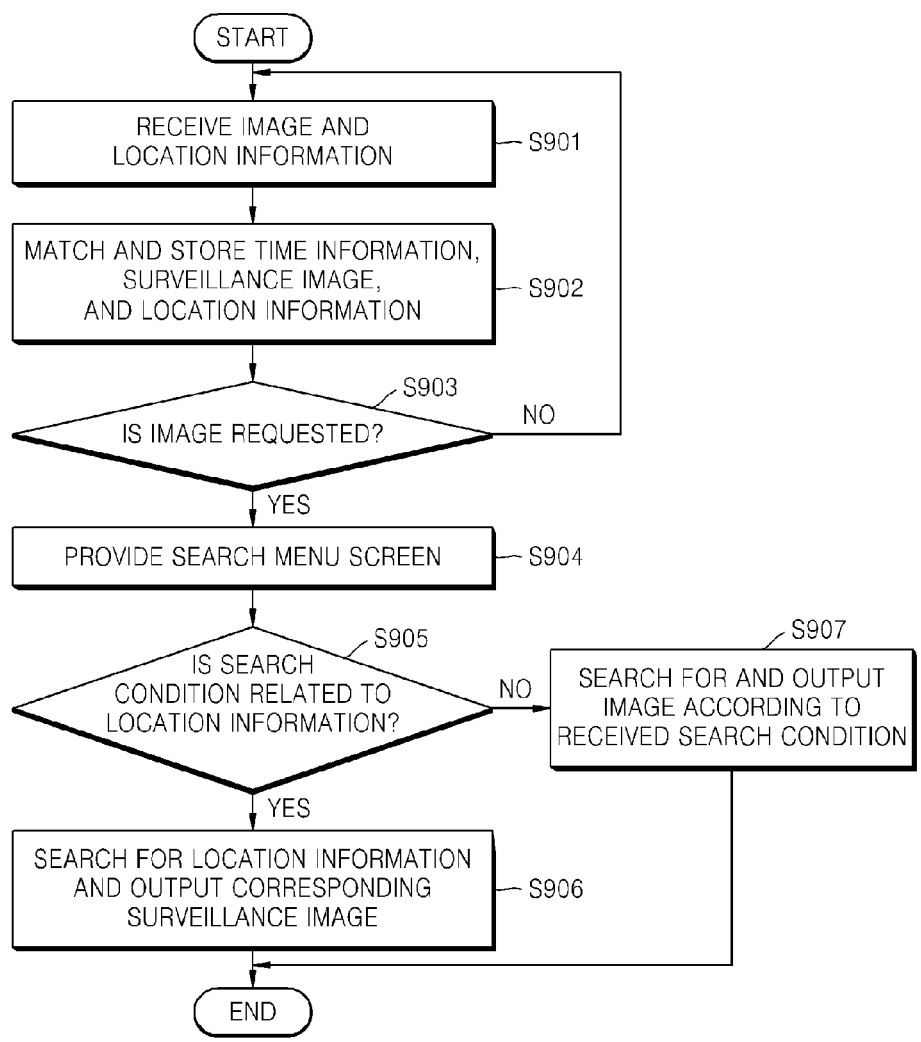
FIG. 12 is a flowchart for schematically describing a method of searching for an image performed by an apparatus for storing and searching for an image, according to an exemplary embodiment.

FIG. 12 is a flowchart for schematically describing a method of searching for an image performed by the apparatus 200, according to an exemplary embodiment.

Referring to FIG. 12, the apparatus 200 receives a surveillance image of a detected object and location information of the detected object in operation S901. The apparatus 200 receives the location information from the plurality of radar sensors 100 with time information, and receives a surveillance image obtained by capturing the detected object from the plurality of cameras 300 with the time information through a wired/wireless communication network.

The apparatus 200 matches and stores the time information, the surveillance image, and the location information in an image database (DB) in operation S902. The apparatus 200 may match and store the location information, the surveillance image, and the time information, or match and store each of the location information and the surveillance image with the time information.

The apparatus 200 checks whether a user requested an image in operation S903. Here, the user may request the image through an input unit of the apparatus 200 or by connecting to the apparatus 200 through a user terminal at a remote place connectable to a mobile communication network or a wired/wireless communication network.

When the user requested an image, the apparatus 200 provides a search menu screen capable of searching various surveillance images stored in the image DB of a storage unit, in operation S904. Here, the search menu screen may be configured such that the user may directly input a search condition, or may classify and provide predetermined search conditions. The user selects a desired range to be searched on the search menu screen through the input unit of the apparatus 200 or an input unit of a terminal device of the user connected to the apparatus 200.

If it is determined that the search condition is related to the location information in operation S905, the apparatus 200 searches for the location information in the image DB and outputs a surveillance image stored in connection with the searched location information in operation S906. Here, the apparatus 200 may provide a list of searched surveillance images to the user and the user may select and check a desired surveillance image from the list. The list may also provide the time information, and the user may select and check a surveillance image at a desired time from the list.

If it is determined that the search condition is related to, for example, time or a type of the object, aside from the location information in operation S905, the apparatus 200 searches for and outputs an image according to the corresponding search condition in operation S907.

In the above embodiments, the location information of the object includes the object distance and the phase, but alternatively, the location information may include an (x,y) coordinate value of the object calculated based on the object distance and the phase. The (x,y) coordinate value may be calculated by a radar sensor or an apparatus for storing and searching for an image.

Figure 13:
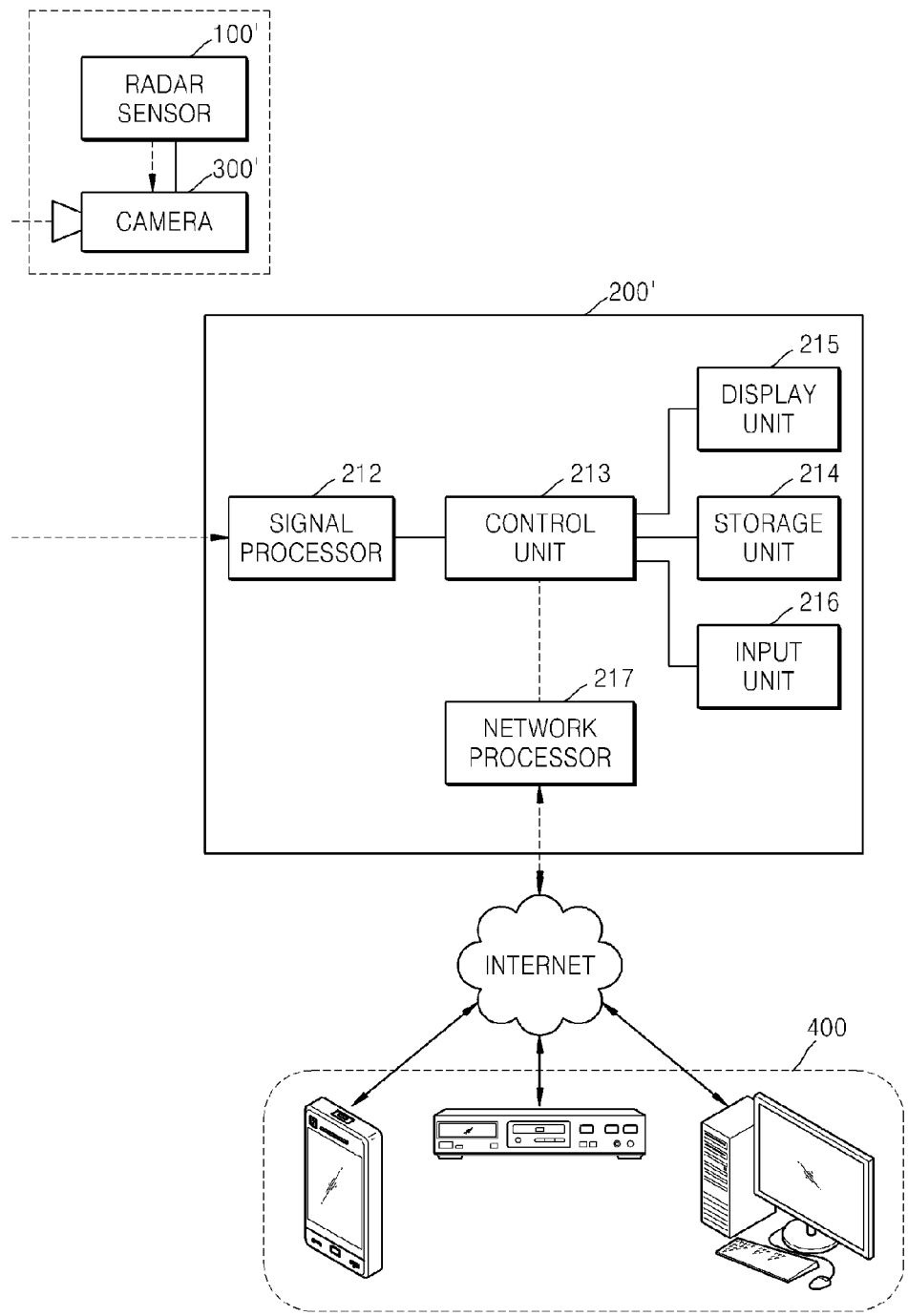
FIG. 13 is a block diagram schematically illustrating an apparatus for storing and searching for an image, according to another exemplary embodiment.
Figure 14:
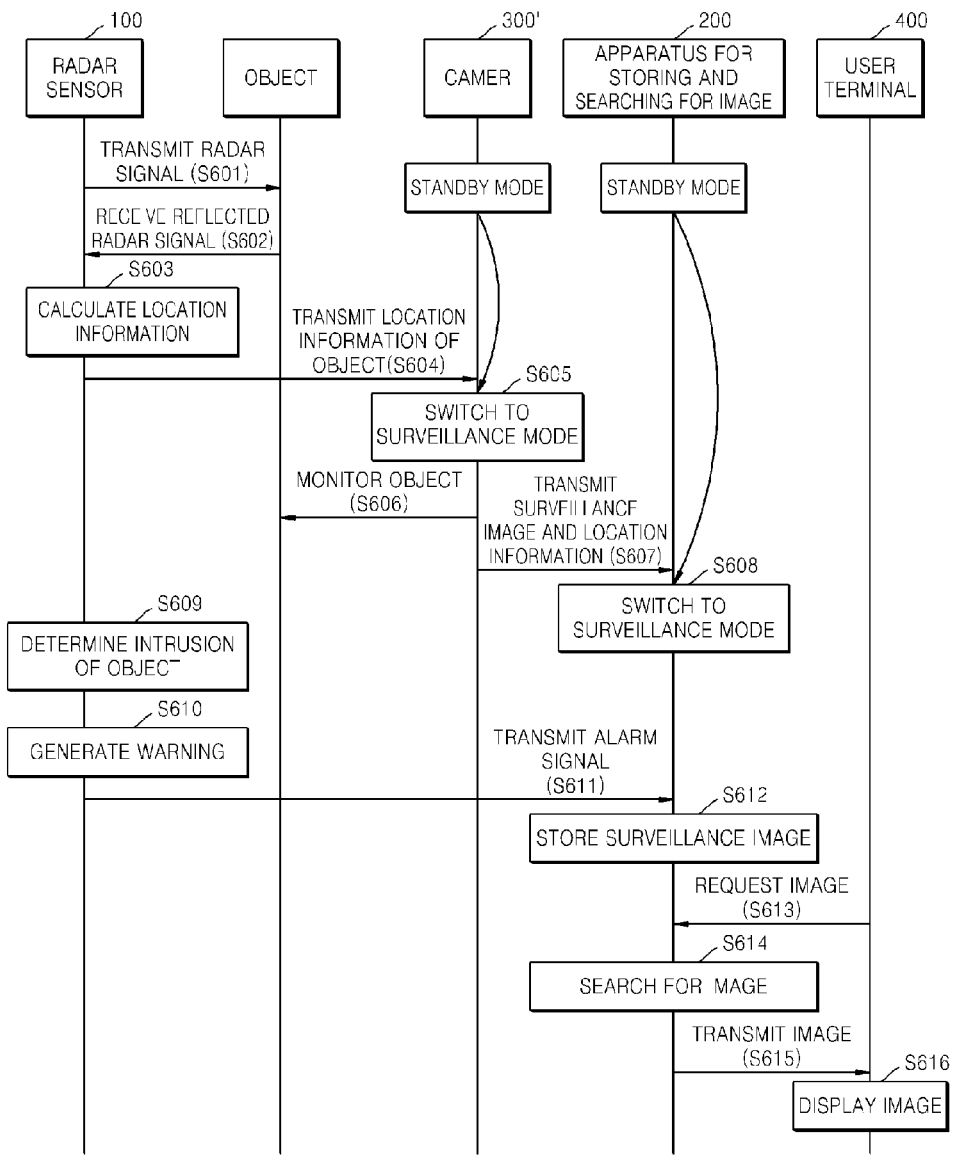
FIG. 14 is a flowchart for schematically describing a surveillance method performed by a radar paired surveillance system, according to another exemplary embodiment.

FIG. 13 is a block diagram schematically illustrating an apparatus 200' for storing and searching for an image, according to another exemplary embodiment. FIG. 14 is a flowchart for schematically describing a surveillance method performed by a radar paired surveillance system, according to another exemplary embodiment.

The radar paired surveillance system of FIGS. 13 and 14 are different from a radar paired surveillance system including the apparatus 200 of FIG. 6 since a radar sensor 100' transmits location information of an object to a camera 300' and the apparatus 200' receives the location information and a surveillance image of the object from the camera 300'. The radar sensor 100' is detachably or fixedly included in the camera 300', and may be the transceiver integrated radar sensor 100A of FIG. 2.

Hereinafter, the surveillance method of the radar paired surveillance system will now be described with reference to FIGS. 13 and 14.

The radar sensor 100' transmits a radar signal to a surveillance range in operation S601 and receives the radar signal reflected from an object in operation S602. Here, the camera 300' and the apparatus 200' are in a standby mode.

The radar sensor 100' calculates location information of the object based on the reflected radar signal in operation S603. The location information may include an object distance and a phase.

The radar sensor 100' transmits the location information to the camera 300' in operation S604.

Upon receiving the location information from the radar sensor 100', the camera 300' is switched from the standby mode to a surveillance mode in operation S605. Then, the camera 300' sets its PTZ value based on the location information, and monitors the object by adjusting a photographing direction and a focus in operation S606. The camera 300' transmits a surveillance image captured in the surveillance mode and the location information of the object to the apparatus 200' in operation S607. The radar sensor 100' may directly transmit the location information to the apparatus 200'.

The apparatus 200' may include a signal processor 212, a control unit 213, a storage unit 214, a display unit 215, an input unit 216, and a network processor 217.

The signal processor 212 receives the surveillance image and the location information of the object, and processes the surveillance image according to a predetermined algorithm.

The control unit 213 controls each element of the apparatus 200'. When the signal processor 212 received the location information and the surveillance image from the camera 300', the control unit 213 wakes up the apparatus 200' and switches the apparatus 200' from the standby mode to a surveillance mode in operation S608.

The storage unit 214 may build a database and store a surveillance image and the location information by matching the surveillance image and the location information with time information as shown in FIG. 8. The time information may be a time stamp. The storage unit 214 may be a magnetic disc, a memory card, or an optical disc that is embedded in or installable to the apparatus 200'.

The radar sensor 100' determines an intrusion of the object while continuously estimating the object distance. The radar sensor 100' determines that the object intruded if the object distance is within a predetermined intrusion distance in operation S609, and generates an alarm signal and a warning notifying the intrusion of the object in operation S610. Also, the radar sensor 100' transmits the alarm signal to the camera 300' and the apparatus 200' in operation S611.

When the control unit 213 receives the alarm signal from the signal processor 212 while the apparatus 200' operates in the surveillance mode, the control unit 213 then stores the surveillance image and the location information transmitted from the camera 300' to the signal processor 212 in the storage unit 214 by matching the surveillance image and the location information with the time information, in operation S612. Alternatively, the control unit 213 may store the surveillance image and the location information in the storage unit 214 after the camera 300' is switched from the standby mode to the surveillance mode. Here, the surveillance image may be stored in uniform cycles.

Upon receiving a search condition and an image request from the user terminal 400 at a remote place through the network processor 217 in operation S613, the control unit 213 searches for a surveillance image according to the search condition in operation S614 and transmits the searched surveillance image to the user terminal 400 through the network processor 217 in operation S615.

A search menu screen for searching various surveillance images stored in an image DB of the storage unit 214 is provided on the user terminal 400. Here, the search menu screen may be configured such that the user may directly input the search condition or may classify and provide predetermined search conditions. The user may select a desired range to be searched from the search menu screen through an input unit of a terminal device of the user connected to the apparatus 200'.

When the search condition is related to the location information, the control unit 213 searches for the location information from the image DB of the storage unit 214 and outputs a surveillance image stored in relation to the searched location information. Here, the control unit 213 may provide a list of searched surveillance images to the user and the user may select and check at least one desired surveillance image from the list. The list may also provide the time information and the user may select and check at least one surveillance image at a desired time from the list. When the search condition is, for example, a time or a type of the object, aside from the location information, the control unit 213 may search for and output an image according to the corresponding search condition.

The network processor 217 may transmit the searched surveillance image to the user terminal 400 at a remote place through a network wirelessly or wiredly. The user terminal 400 displays the received surveillance image in operation S616. The user terminal 500 may be a mobile phone, a PC, a DVR, or an NVR.

Meanwhile, when the user requests an image through the input unit 216 of the apparatus 200', the control unit 213 may search for and select the surveillance image from the storage unit 214 based on an input search condition and output the surveillance image to the display unit 215. Here, the control unit 213 may search surveillance images stored in the storage unit 214 based on the location information of the object.

The display unit 215 displays an image output from the signal processor 212 or a menu item generated according to a control signal input through the input unit 216. If the user requests an image through the input unit 216, the display unit 215 may display a search menu item for the user to directly or indirectly select a type and location of the object, and a time. The display unit 215 may provide visual and/or auditory information to the user, and the display unit 215 may be an LCD, an OLED, or an EPD. The display unit 215 may be in a touch screen form so as to receive an input from the user through a touch, and may operate as a user interface.

The input unit 216 may be realized in hardware or software. When the input unit 216 is realized in hardware, for example, a signal may be input through a wired/wireless remote controller or a menu button integrally included in the display unit 215. When the input unit 216 is realized in software, the input unit 216 may be displayed on a display screen of the display unit 215, and for example, a signal may be input through a pointing device, such as a mouse, a keyboard, or a track ball, or sensitivity of a touch screen, such as a finger, a pen, or a stylus system.

A surveillance system according to an exemplary embodiment may effectively control a method of storing image information by obtaining location information of an object by using a radar technology, i.e., a stable search technology, compared to a general system for generating a trigger signal for storing an image.

Accordingly, the surveillance system stores a surveillance image only when it is determined that the object intruded a range considered to be a danger zone by a radar sensor. Thus, it is possible to store surveillance images optimally in an NVR or DVR and, when a system is expanded, to effectively store a surveillance image at a required point of time by reducing a storage amount of data under a cloud environment that does not use an NVR, DVR or a storage amount of image data in a PC.

Also, since the surveillance system is paired with a radar sensor to match and store information of the radar sensor (type and/or location information of an object) with a surveillance image, a specific surveillance image may be searched for at a high speed by using the information of the radar sensor without having to search all surveillance images while searching for the specific surveillance image. Here, the surveillance image may be searched at a high speed by using one piece of the information of the radar sensor, such as location information of an object. Accordingly, in an exemplary embodiment, a surveillance image may be simply searched for without having to analyze surveillances image to detect an event, store a plurality of pieces of data derived through the analyzing, and search the surveillance images based on the plurality of pieces of data.

According to exemplary embodiments, an image may be effectively stored and searched for by storing surveillance images by using information of a radar sensor.

While this inventive concept has been particularly shown and described with reference to embodiments thereof, it will be understood by those of ordinary skill in the art that various changes in form and details may be made therein without departing from the spirit and scope of the inventive concept as defined by the appended claims. For example, the radar sensor and a radar signal are only examples used for implementing the inventive concept of the present application, and thus, a different sensor and signal may be used to detect an object and store images of the object. That is, the exemplary embodiments described herein should be considered in a descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. An apparatus for storing and searching for an image, the apparatus comprising:
   a first signal processor which receives location information about an object detected by a radar sensor, generates and transmits a camera control signal to a camera based on the location information about the object so that the camera performs a surveillance in a direction according to the camera control signal, and receives from the radar sensor an alarm signal notifying an intrusion of the object into a preset area;
   a second signal processor which receives a surveillance image of the object received from the surveillance of the camera; and
   a control unit which stores the surveillance image in a storage unit,
   wherein the camera performs the surveillance in a preset method when the apparatus is in a standby mode, and the control unit switches the apparatus from the standby mode to a surveillance mode in response to the receiving the location information about the object so that the first signal processor generates the camera control signal, and
   wherein the control unit matches and stores, in the storage unit, the surveillance image of the object and location and time information about the object corresponding to the intrusion, in response to the receiving the alarm signal.

2. The apparatus of claim 1, wherein the camera control signal controls the camera in the direction using at least one of a pan value, tilt value and a zoom value.

3. The apparatus of claim 1, wherein the control unit receives from a user an image request comprising a search condition indicating a portion of a surveillance range which is initially covered by the radar sensor and the camera before the camera control signal is generated, and searches for the stored surveillance image in response to the image request.

4. The apparatus of claim 1, wherein the intrusion of the object into the preset area is determined by the radar sensor, and
   wherein the preset area is a portion of a surveillance range which is initially covered by the radar sensor and the camera before the camera control signal is generated.

5. The apparatus of claim 1, further comprising at least one of the radar sensor, the camera, the storage unit and a display unit,
   wherein the display unit allows a user to input an image request comprising a search condition related to a user-designated location information, and the control unit searches the storage unit and outputs the stored surveillance image in response to the image request.

6. The apparatus of claim 1 further comprising the radar sensor,
   wherein the sensor determines the intrusion of the object when a distance between the radar sensor and the object is within a predetermined intrusion distance, and generates the alarm signal.

7. An apparatus for storing and searching for an image, the apparatus comprising:
   a signal processor which receives location information about an object detected by a radar sensor and a surveillance image of the object, from a camera that performs a surveillance in a direction according to the location information about the object received from the radar sensor, and the signal processor receives from the radar sensor an alarm signal notifying an intrusion of the object into a preset area; and a control unit which stores the surveillance image in a storage unit after receiving the alarm signal, wherein the camera performs the surveillance in a preset method when the apparatus is in a standby mode, and the control unit switches the apparatus from the standby mode to a surveillance mode in response to the receiving the location information about the object so that the camera performs the surveillance in the direction according to the location information about the object, and wherein the control unit matches and stores, in the storage unit, the surveillance image of the object and location and time information about the object corresponding to the intrusion, in response to the receiving the alarm signal.

8. The apparatus of claim 7, wherein the control unit, upon receiving an image request according to a search condition related to a user-designated location information, searches the storage unit and outputs the stored surveillance image in response to the image request.

9. A method of storing and searching for an image using a surveillance apparatus for controlling a camera, the method comprising:

receiving location information about an object detected by a radar sensor;

switching, in response to the receiving the location information about the object, the surveillance apparatus from a standby mode to a surveillance mode, wherein the camera performs the surveillance in a preset method when the surveillance apparatus is in the standby mode;

generating and transmitting a camera control signal to the camera based on the location information about the object so that the camera performs a surveillance in a direction according to the camera control signal;

receiving from the sensor an alarm signal notifying an intrusion of the object into a preset area;

receiving a surveillance image of the intruding object received from the surveillance of the camera; and matching and storing, in a storage unit, the surveillance image of the object and location and time information about the object corresponding to the intrusion, in response to the receiving the alarm signal.

10. The method of claim 9, wherein the camera control signal controls the camera in the direction using at least one of a pan value, tilt value and a zoom value.

11. The method of claim 9, further comprising receiving an image request according to a search condition related to a user-designated location information; and searching the storage unit and outputting the stored surveillance image in response to the image request.

12. A method of storing and searching for an image using a surveillance apparatus for controlling a camera, the method comprising:

receiving location information about an object detected by a radar sensor and switching, in response to the receiving the location information about the object, the surveillance apparatus from a standby mode to a surveillance mode, wherein the camera performs a surveillance in a preset method when the surveillance apparatus is in the standby mode;

receiving a surveillance image of the object, from a camera that performs the surveillance in a direction according to the location information about the object received from the radar sensor when the surveillance apparatus is in the surveillance mode;

receiving from the sensor an alarm signal notifying an intrusion of the object into a preset area; and matching and storing, in a storage unit, the surveillance image of the object and location and time information about the object corresponding to the intrusion, in response to the receiving the alarm signal.

13. The method of claim 12, further comprising:

upon receiving an image request according to a search condition related to a user-designated location information, searching the storage unit and outputting the stored surveillance image in response to the image request.

* * * * *